United States Patent [19]

Mukai et al.

[11] Patent Number: 4,643,947

[45] Date of Patent: Feb. 17, 1987

[54] MAGNETIC RECORDING MATERIAL

[75] Inventors: Yasuo Mukai, Yokohama; Masanobu Shimizu, Ebina, both of Japan

[73] Assignee: Victor Company of Japan, Ltd., Japan

[21] Appl. No.: 624,405

[22] Filed: Jun. 21, 1984

[30] Foreign Application Priority Data

Jun. 22, 1983 [JP] Japan ................................ 58-110937

[51] Int. Cl.$^4$ ............................................... G11B 5/70
[52] U.S. Cl. ................... 428/413; 252/62.54; 360/135; 427/128; 428/416; 428/694; 428/695; 428/900; 428/524; 428/460
[58] Field of Search ............... 428/694, 413, 416, 695, 428/900, 324, 460; 252/62.54; 427/128; 360/134–136

[56] References Cited

U.S. PATENT DOCUMENTS

| 3,148,082 | 9/1964 | Di Ricco | 428/694 |
| 3,474,073 | 10/1969 | Higashi | 360/135 |
| 3,560,388 | 2/1971 | Higashi | 360/135 |
| 3,840,400 | 10/1974 | Yamada et al. | 252/62.54 |
| 4,070,522 | 1/1978 | Ogasa | 428/694 |

FOREIGN PATENT DOCUMENTS 2218141 12/1978 Fed. Rep. of Germany .

Primary Examiner—Ellis P. Robinson
Attorney, Agent, or Firm—Lowe, Price, LeBlanc, Becker & Shur

[57] ABSTRACT

A magnetic recording material which comprises a non-magnetic substrate, and a magnetic layer formed on at least one surface of the substrate. The magnetic layer is made of a uniform dispersion of a magnetic powder in a mixture of epoxy and urea resins used in an amount from 40 to 200 wt % of the magnetic powder.

5 Claims, No Drawings

MAGNETIC RECORDING MATERIAL

BACKGROUND OF THE INVENTION

1. Field of the Invention

This invention relates to magnetic recording materials, particularly magnetic hard discs which have much improved film properties and magnetic characteristics.

2. Description of the Prior Art

Magnetic recording materials adapted to use in magnetic disc recording and reproducing apparatus are usually made by procedures which comprise mixing magnetic powders, binder resins and solvents, applying the resulting magnetic paint on a disc substrate, and baking the applied paint for curing. The magnetic recording material of this type is now required to have improved magnetic and mechanical performances because the recent trend toward high recording density causes the disc and magnetic heads to come closer to each other. In addition, starting and stopping operations of the apparatus under contact with the disc are at present adopted as usual practice. More particularly, the magnetic material should have good magnetic characteristics such as squareness ratio of BH loop, coersive force, residual flux density, and the like. Also, from the mechanical standpoint, it is necessary that the magnetic layer be brought to intimate contact with the substrate, be small in thickness, and be flat and lubricative on the surface thereof. In addition, the number of missing pulse errors and extra pulse errors which may be caused on the basis of both magnetic and mechanical defects of the magnetic material must be small.

SUMMARY OF THE INVENTION

It is accordingly an object of the present invention to provide magnetic recording materials which comprise a magnetic layer making use of a specific combination of binder resins to ensure good dispersability of magnetic particles whereby good magnetic characteristics and good mechanical or physical properties are attained at the same time.

According to the present invention, there is provided a magnetic recording material of the type which comprises a non-magnetic substrate, and a magnetic layer formed on the substrate, the magnetic layer being made of a composition which comprises a uniform dispersion of a magnetic powder in a mixture of epoxy and urea resins used in an amount from 40 to 200 wt% of the magnetic powder. Typical of the magnetic materials to which the present invention is directed is a so-called hard disc.

DETAILED DESCRIPTION AND EMBODIMENTS OF THE INVENTION

The present invention is characterized in that the binder resin for the magnetic layer is a combination of epoxy and urea resins. The epoxy resins useful in the practice of the invention are not critically limited but bisphenol A-type epoxy resins are preferred from the standpoint of mechanical characteristics, particularly hardness. In practice, the molecular weight of the epoxy resin generally ranges from 800 to 8000. Bisphenol A-type epoxy resins are commercially available, for example, from Shell Chemical Co., Ltd., under the designations of Epikote 1001, Epikote 1007, etc.

Urea resins are not also critically limited but any known urea resins may be used in the practice of the invention provided that they are miscible with epoxy resins. Especially, when used in combination with bisphenol A-type epoxy resins, alkylated urea resins such as are preferred. Examples of the alkylated urea resins include methylated, ethylated, propylated, iso or n-butylated and the like alkylated urea resins, of which iso-butylated urea resin is most preferable. In the best mode, bisphenol A-type epoxy resins are used in combination with iso-butylated urea resin, by which dispersion of magnetic particles is remarkably improved, leading to improvements of the resulting magnetic layer with respect to magnetic characteristics.

A variety of alkylated urea resins are commercially sold, for example, from Dainippon Ink Chem. Ind. Co., Ltd. under the designations of Beckamin G-1850 and Beckamin P-138, from Hitachi Chemical Co., Ltd. under the designation of Melan 11, from Mitsui Toatsu Chemical Co., Ltd. under the designations of Uban 10S-60 and Uban 10R, and the like.

The mixing ratio of expoxy to urea resins is generally, from 90:10 to 10:90, preferably from 70:30 to 50:50, on the weight basis. The total amount of epoxy and urea resins are generally from about 40 to 200 wt%, preferably about 60 to 120 wt%, of magnetic powder used.

The magnetic powders useful in the present invention are those powders ordinarily used for these purposes and include, for example, magnetic oxide powders such as gamma-$Fe_2O_3$, Co-gamma-$Fe_2O_3$, Co—$Fe_3O_4$, $CrO_2$ and the like, and surface-treated magnetic metal powders such as Co, Ni, Fe and the like.

For the manufacture of the magnetic recording materials according to the invention, magnetic powders are dispersed in a mixture of epoxy and urea resins dissolved in solvents. The resulting dispersion is applied onto at least one surface of a non-magnetic substrate and heated for curing at a temperature from 150° to 200° C. for about 15 minutes to 2 hours to form a magnetic layer having a dry thickness of 0.2 to 2 microns on the substrate as usual. The above-defined temperature and time conditions are sufficient to completely cure the mixture of the binder resins. Where the magnetic recording material is a magnetic disc, the cured material may be polished such as by a polishing tape made, for example, of alumina, silicon carbide or the like to obtain the disc. Solvents for the mixed binder include, for example, alcohols such as methanol, ethanol, propanol, butanol and the like, aromatic compounds such as xylene, toluene, benzene and the like, ketones such as acetone, methyl ethyl ketone, methyl isobutyl ketone and the like, and mixtures thereof.

If necessary, known additives which are ordinarily employed in this field may be added to the dispersion. Such additives include, for example, dispersants, lubricants, abrasive agents, antistatic agents, surfactants and the like.

The non-magnetic substrates may be sheets or plates metals such as aluminum, magnesium, copper and the like, and glass or ceramics.

The present invention is particularly described by way of examples.

EXAMPLE 1

Fifty parts by weight of gamma-$Fe_2O_3$, about 10 parts by weight of alumina powder, about 26 parts by weight of epoxy resin (Epikote 1007, by Shell Chemical Co., Ltd.), about 13 parts by weight of urea resin (Melan 11), about 1 part by weight of lecithin and about 200 parts by weight of a mixed solvent of toluene and butanol were mixed in a ball mill for about 24 hours, thereby obtaining a magnetic paint. This magnetic paint was applied onto a disc substrate by a spin coating and dried, followed by keeping at 200° C. for 30 minutes to bake and cure the applied layer and polishing by means of a polishing tape. The thickness of the layer had a thickness of 0.8 micron.

EXAMPLE 2

The general procedure of Example 1 was repeated using a curing temperature of 175° C., thereby obtaining a magnetic disc.

EXAMPLE 3

Fifty parts by weight of gamma-$Fe_2O_3$, about 10 parts by weight of alumina powder, about 26 parts by weight of epoxy resin (Epikote 1007, by Shell Chemical Co., Ltd.), about 12 parts by weight of urea resin (Melan 11), about 1 part by weight of a curing accelerator (S475, i.e. 50% ethylene glycol monoethyl ether solution of morphonyl paratoluenesulfonate), about 1 part by weight of lecithin, and about 200 parts by weight of a mixed solvent of toluene and butanol were mixed in a ball mill for about 24 hours to give a magnetic paint. The paint was applied onto a non-magnetic disc substrate and dried, followed by keeping at 150° C. for 30 minutes for baking and curing and subsequently polishing to obtain a magnetic disc.

EXAMPLE 4

Fifty parts by weight of magnetic gamma-$Fe_2O_3$ powder, about 10 parts by weight of alumina powder, about 19 parts by weight of epoxy resin (Epikote 1001, by Shell Chemical Co., Ltd.), about 20 parts by weight of urea resin (Beckamin G-1850), about 1 part by weight of lecithin, and about 200 parts by weight of a mixed solvent of toluene and butanol were used in the same manner as in Example, thereby obtaining a magnetic disc.

COMPARATIVE EXAMPLE 1

The general procedure of Example 1 was repeated using phenolic resin (PC-25, by Sumitomo Chemical Ind. Co., Ltd.) instead of the urea resin, thereby obtaining a magnetic disc.

COMPARATIVE EXAMPLE 2

The general procedure of Example 2 was repeated using phenolic resin (PC-25, by Sumitomo Chemical Ind. Co., Ltd.) instead of the urea, thereby obtaining a magnetic disc.

The magnetic discs obtained in the examples and comparative examples were subjected to measurements of film characteristics and magnetic characteristics. The results are shown in Table below.

| | Film Characteristics | | | | Magnetic Characteristics | | |
|---|---|---|---|---|---|---|---|
| | Surface hardness *1 | Surface Roughness*2 (μm) | Number of Surface Defects *3 | Adhesiveness*4 | Hc (Oe) | Br (Gauss) | Rs |
| Ex. 1 | 6H | 0.010 | 8 | 100/100 | 420 | 970 | 0.83 |
| Ex. 2 | 6H | 0.010 | 7 | 100/100 | 421 | 970 | 0.83 |
| Ex. 3 | 6H | 0.008 | 6 | 100/100 | 420 | 970 | 0.83 |
| Ex. 4 | 6H | 0.009 | 7 | 100/100 | 418 | 990 | 0.85 |
| Com. Ex. 1 | 6H | 0.014 | 20 | 100/100 | 421 | 920 | 0.80 |
| Com. Ex. 2 | 3H | 0.029 | 280 | 42/100 | 422 | 900 | 0.80 |

*1 The surface hardness is expressed in terms of pencil hardness.
*2 The surface roughness means an average roughness on the center line (Ra).
*3 The number of surface defects means a number of errors on one surface.
*4 The adhesiveness was determined by a cross cut test in which the magnetic layer was cut to have one hundred squares each with 1 mm × 1 mm in dimension, on which a cellophane adhesive tape was attached and then peeled off to determine the number of the squares not peeled off.

The above results revealed that the magnetic recording materials of the invention are superior to the materials of Comparative Examples with respect to the magnetic characteristics, i.e. coersive force, Hc, residual flux density, Br, and squareness ratio, Rs. Moreover, this is true of the film characteristics and particularly the number of surface defects.

What is claimed is:

1. A magnetic recording material of the magnetic hard disc type which comprises a non-magnetic substrate, and a magnetic layer formed on at least one surface of said substrate, said magnetic layer being made of a thermally cured product of a composition which comprises a uniform dispersion of a magnetic powder in a binder consisting essentially of a mixture of epoxy and urea resins used in an amount from 40 to 200 wt% of the magnetic powder, the mixing ratio of the epoxy to the urea resins being from 90:10 to 10:90.

2. The magnetic recording material according to claim 1, wherein said binder is a mixture of a bisphenol A epoxy resin and an alkylated urea resin.

3. The magnetic recording material according to claim 2, wherein said alkylated urea resin is isobutylated urea resin.

4. The magnetic recording material according to claim 1, wherein the mixing ratio is from 70:30 to 50:50.

5. The magnetic recording material according to claim 1, wherein the total amount of said binder is from 60 to 120 wt% of the magnetic powder.

* * * * *